(12) United States Patent
Savage et al.

(10) Patent No.: US 6,304,885 B1
(45) Date of Patent: Oct. 16, 2001

(54) DIGITAL DATA RETRIEVING, ORGANIZING AND DISPLAY SYSTEM

(75) Inventors: Nannette E. Savage, Colchester; Ray Malone, New London, both of CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 748 days.

(21) Appl. No.: 08/649,972

(22) Filed: May 1, 1996

(51) Int. Cl.[7] ............................................. G06F 3/00
(52) U.S. Cl. ................................................. 707/500
(58) Field of Search ................................. 395/762, 776, 395/161, 784, 785, 347, 349, 350, 351, 614, 615, 701, 702, 703, 706, 712; 364/188; 707/501, 511, 514, 523, 522, 103, 104, 500; 345/347, 349, 350, 351

(56) References Cited

U.S. PATENT DOCUMENTS

| | | | |
|---|---|---|---|
| 4,663,704 | * 5/1987 | Jones et al. | 364/188 |
| 4,951,192 | * 8/1990 | Chase, Jr. et al. | 395/706 |
| 5,119,476 | * 6/1992 | Texier | 395/347 |
| 5,339,435 | * 8/1994 | Lubkin et al. | 395/200.5 |
| 5,347,628 | * 9/1994 | Brewer et al. | 395/351 |
| 5,414,626 | * 5/1995 | Boorse et al. | 364/424 |
| 5,446,882 | * 8/1995 | Capps et al. | 395/615 |
| 5,499,357 | * 3/1996 | Sonty et al. | 395/500 |
| 5,500,881 | * 3/1996 | Levin et al. | 395/703 |
| 5,564,049 | * 10/1996 | Schmidt | 395/615 |
| 5,581,764 | * 12/1996 | Fitzgerald et al. | 395/703 |
| 5,649,200 | * 7/1997 | Leblang et al. | 395/703 |

* cited by examiner

*Primary Examiner*—Stephen S. Hong
(74) *Attorney, Agent, or Firm*—Michael J. McGowan; Prithvi C. Lall; Michael F. Oglo

(57) ABSTRACT

A digital data retrieving, organizing and display device for retrieving information from a number of disparate sources relating to development of a complex system including firmware, hardware and software and organizing and displaying on cards the information as selected by an operator. The device comprises a data map, a plurality of card display means, and a control means. The data map defines types of available information relating to the development of the complex system, and includes at least one external card link. Each card display element facilitates the display of a card having a selected type of information relating to the development of a complex system. The control means is responsive to operator input for controlling the data map display means and the card display element to enable the display of a card having a type of information as selected by the operator. The information that can be displayed can be obtained from a number of disparate sources, and the system further includes a data acquisition element and an update element for obtaining information from the disparate sources to be used by the card display element.

10 Claims, 7 Drawing Sheets

DIGITAL DATA RETRIEVING, ORGANIZING AND DISPLAY SYSTEM

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of digital data processing system and more particularly to systems for accumulating information from a number of disparate sources and organizing it for easy viewing.

(2) Description of the Prior Art

Digital computer systems have been used for a number of years to store and process data. A problem arises, however, when the data which is to be processed is from a number of disparate sources, particularly when the data is directed to the design, development and testing of a complex system including firmware, hardware and software in which a number of companies may be involved.

SUMMARY OF THE INVENTION

It is therefore an object of the invention to provide a new and improved system for quickly and easily accumulating status and other information concerning the design and development of a complex system from a number of disparate sources, for viewing in an organized manner.

Briefly, the invention provides a digital data retrieving, organizing and displaying system for retrieving information from a number of disparate sources relating to development of a complex system and organizing and displaying on cards the information as selected by an operator. The digital data retrieving, organizing and displaying system comprises a data map, a plurality of card display means, and a control means. The data map defines types of available information relating to the development of a complex system, the data map including at least one external card link. Each of the plurality of card displaying means facilitates the display of a card having a selected type of information relating to the development of a complex system. The control means is responsive to operator input indicia for controlling the data map display means and the card display means to enable the display of a card having a selected type of information as selected by the operator. The information to be displayed can be obtained from a number of disparate sources, and the system further includes data acquisition means and update means for obtaining information from the disparate sources to be used by the card display means.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
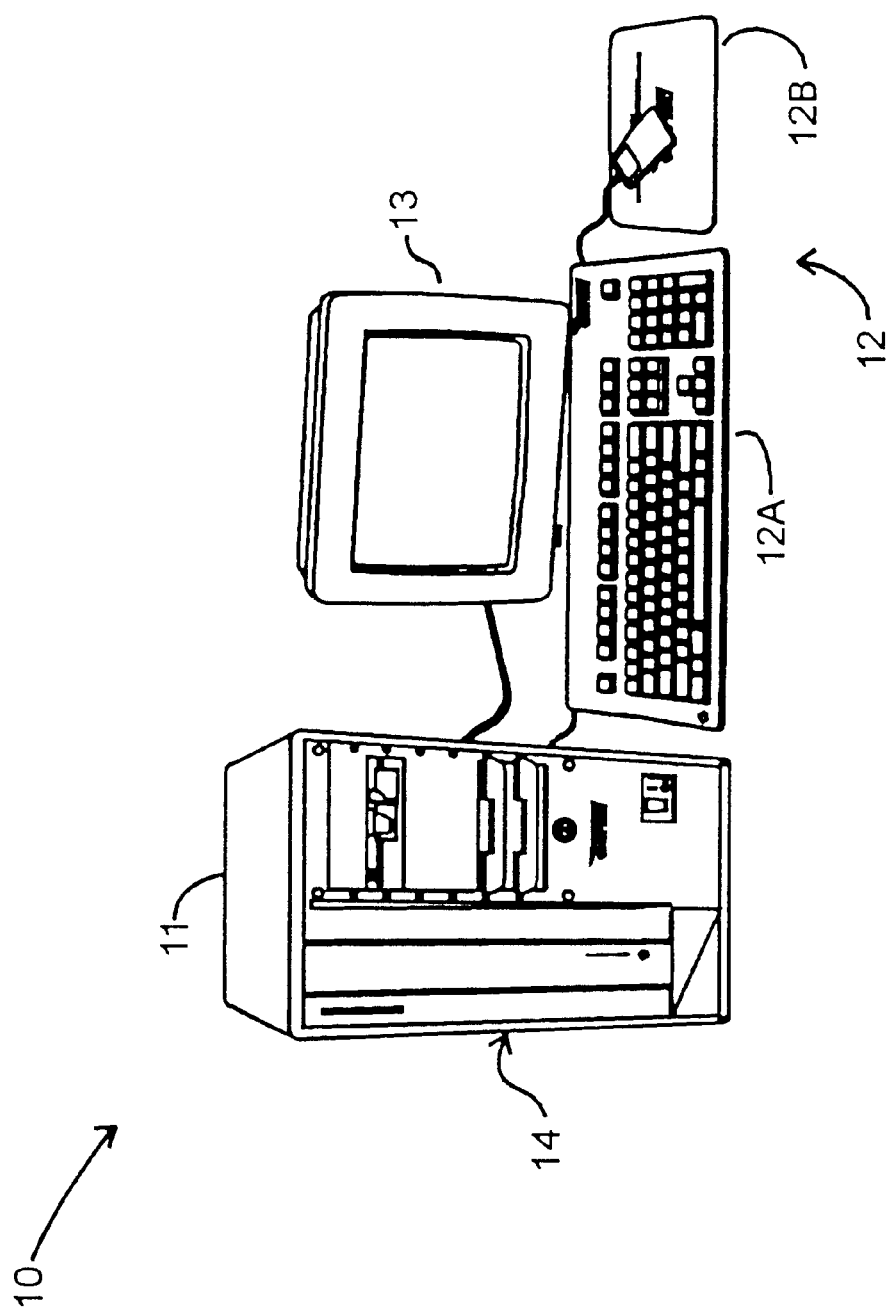
FIG. 1 depicts an illustrative computer system, constructed in accordance with the invention, including an arrangement retrieving and organizing digital data from a large variety of disparate sources and for displaying the data to an operator.

FIG. 1 depicts an illustrative computer system 10 including a data acquisition, organization and display system 20 (FIG. 2) constructed in accordance with the invention. As will be described in detail in connection with FIGS. 2 through 7, the data acquisition, organization and display system 20 retrieves and organizes digital data from a large variety of disparate sources and selectively displays the data to an operator. With a reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, a processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network interfaces, generally identified by reference numeral 14, which are connected to communication links which connect the computer system 10 in a computer network. The network interface 14 enables the computer system 10 to transmit information to, and receive information from, other computer systems in the network, allowing them to share information from databases and other computer files. In addition, if devices such as data acquisition devices (such as sensors), printers and facsimile transmission. and receiving devices, digital audio or video storage and distribution devices, and the like, are connected in the network, they may be used by the various computer systems which are connected in the network; for such devices, the computer systems will transmit information to the various devices enabling them to, for example, print documents in hard-copy form or transmit facsimiles of the documents over the public telephony system, receive document facsimiles, transmit and receive digital audio and video information and the like. The communication links connecting the computer system to other elements of the network may, as is conventional, comprise any convenient information-carrying medium, including wires, optical fibers or other media for carrying signals among the computer systems.

The invention provides a system, including the computer system 10, for retrieving and organizing digital data from a large variety of disparate sources and for displaying the data on the computer's video display device 13. The invention will be described in the context of a system for retrieving, organizing and displaying data that is related to development and construction of a complex system including a number of components which are under control of a computer; in that context, the inventive system provides information as to the status of development, construction and functional testing of the various hardware components of the complex system as well as of the status of the development of the hardware and software which will be used to control the system components. The system is aware of the particular source files for the status information, and can automatically update its information on request from an operator. In one embodiment, the system displays information in a "card" format, and is implemented using conventional HyperCard technology which is readily available. The operations of the system in retrieving and organizing information will be described in connection with FIGS. 2 through 7.

Figure 2:
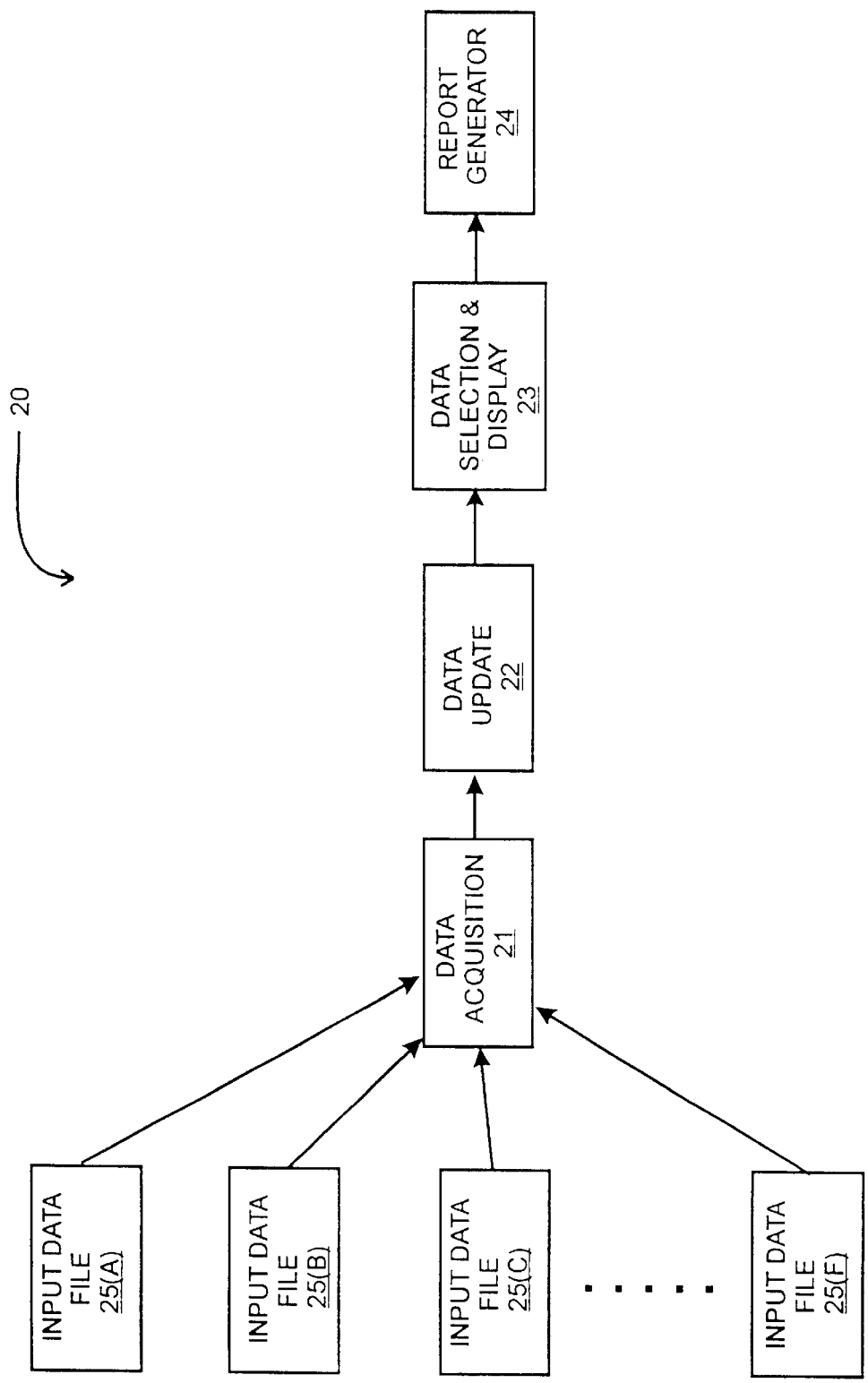
FIG. 2 depicts a functional block diagram of a digital data retrieving, organizing and displaying system constructed in accordance with the invention.

FIG. 2 depicts a functional block diagram of the data acquisition, organization and display system 20 constructed in accordance with the invention. With reference to FIG. 2, the system 20 includes a data acquisition element 21, a data update element 22, a data selection and display element 23 and a report generator 24. The data selection and display element 23, under control of an operator, enables the display of selected data by the computer system's video display device 13. The data selection and display element 23, using HyperCard format, displays the data as selected by the operator in one or more cards.

The data which may be displayed under control of the data selection and display element 23 is, in turn, provided by the data acquisition element 21 and the data update element 22. The data acquisition element 21 periodically, or at particular times as selected by the operator, retrieves particular types of data from one or more input data files 25(A) through 25(F) (generally identified by reference numeral 25(F)) and provides the retrieved data to the data update element 22. The data update element 22, in turn, loads the update data in the HyperCard files used by the data selection and display element 23. The data selection and display element 23, as noted above, allows the operator to select and display selected data in card format. The report generator 24 is provided to enable an operator to print hard-copy reports using the HyperCard data.

Figure 3:
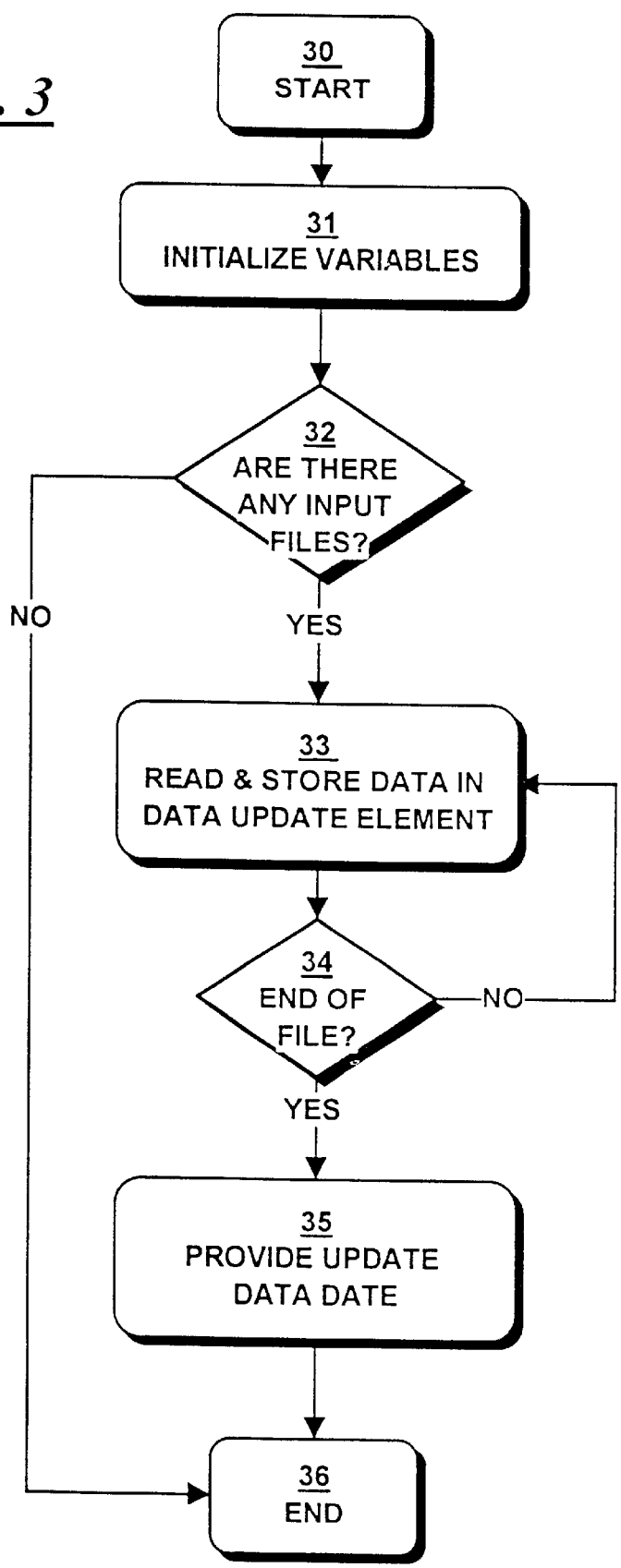
FIGS. 3 and 4 depict flow diagrams useful in understanding the operations of the data acquisition element and data update element depicted in FIG. 2.
Figure 4:
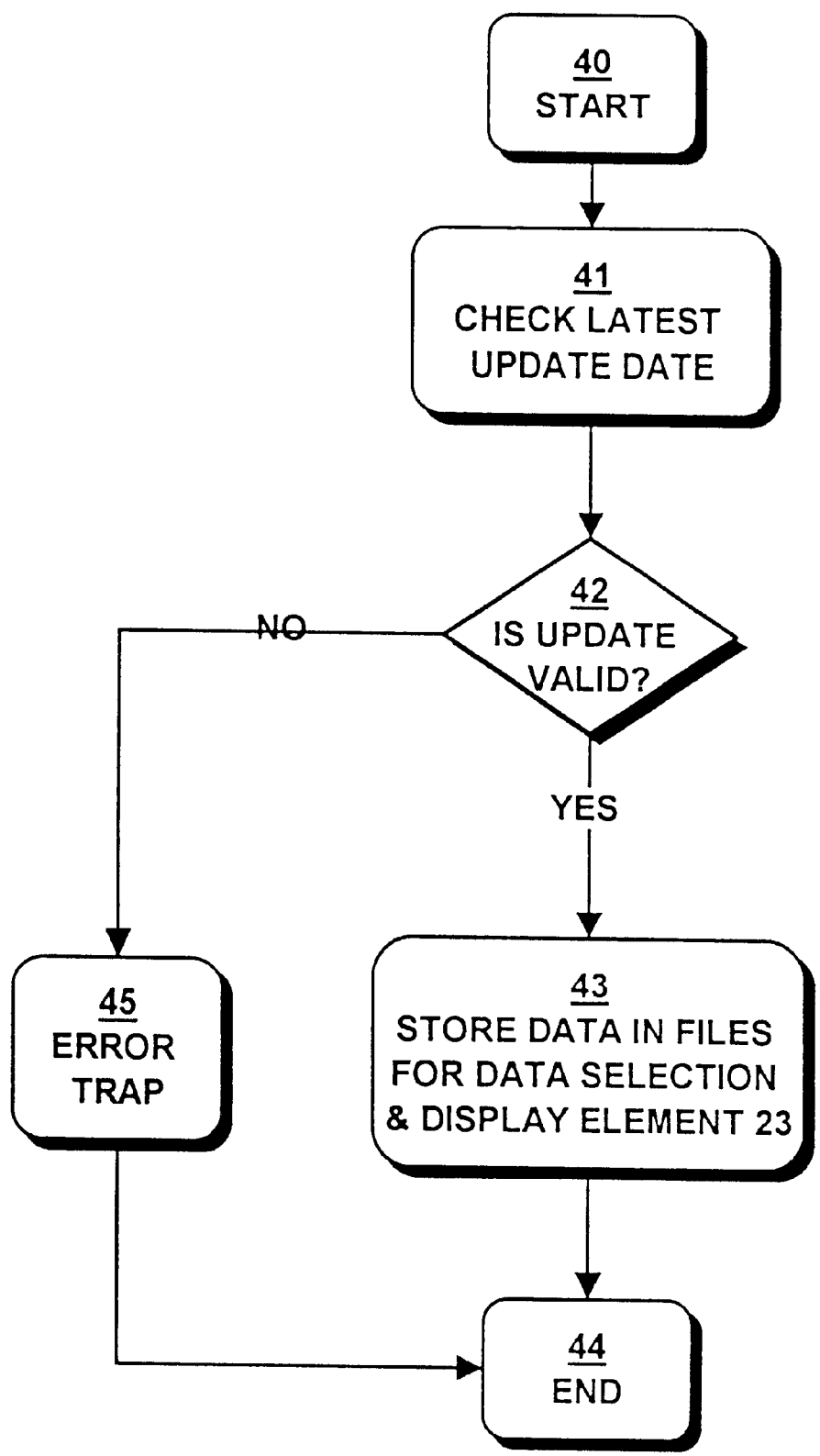

The operations performed by the data acquisition element 21 in acquiring data for update and by the data update element 22 in performing the data update will be described with reference to FIGS. 3 and 4, respectively. With reference initially to FIG. 3, the data acquisition element 21 will go through an initialization step (step 31) and will prompt an operator to provide the identification of a data input file 25(F) which is to be used to provide update data (step 32). Accordingly, when the operator enables a data input file 25(F) itself to be updated, the operator may prompt the data acquisition element to update the information used by the data acquisition, organization and display system 20. The data acquisition element 21 may prompt the operator to provide the data input identification through la conventional dialog box which it displays on the video display device 13.

If the data acquisition element 21 receives the identification of a data input file in step 32, it will sequence to step 33 to retrieve the required update data from the identified file and provide it in a file for the data update element 22. The data acquisition element 21 retrieves the update data element-by-data element (step 33) and, after retrieving each update data element, will determine whether it has reached the end of the selected data input file 25(F) (step 34). If the data acquisition element 21 determines in step 34 that it has not reached the end of the selected data input file 25(F), it will return to step 33 to continue sequencing through the selected data input file 25(F). The data acquisition element 21 will perform steps 33 and 34 through a number of iterations, sequencing through the selected data input file 25(F) to retrieve the data therein that is used by the data selection and display element 23.

At some point, the data acquisition element 21 will determine in step 34 that it has reached the end of the selected data input file 22. At that point, it will sequence to step 3!5 to provide update verification indicia, such as a date, in the file for the data update element 22, which the data update element 22 can use to verify that the file contains current update data. Thereafter, the data acquisition element 21 will terminate operations (step 36).

Returning to step 32, if the operator in that step fails to select a data input file 25(F) within a selected time period, or if the data input file whose identification was provided by the operator does not exist, it may sequence directly to step 36 to terminate operations.

The operations performed by the data update element 22 will be described in connection with FIG. 4. As noted above, the data update element 22 receives the update data as retrieved by the data acquisition element 21 from the data input files, and actually performing the data update in connection with the files used by the data selection and display element 23. With reference to FIG. 4, after receiving the update data file generated by the data acquisition element 21 as described above in connection with FIG. 3, the data update element 22 will first check the update verification data in the update data file (step 41). As described above in connection with FIG. 3, the data acquisition element 22 generates the update verification data in step 35 to enable the data update element 22 to verify that this update data file contains update data that needs to be inserted in the files used by the data selection and display element 23.

After checking the update verification data, the data update element 22 will determine whether the update verification data indicates that the update data file contains valid update data, that is, that it contains update data that needs to be inserted in the files used by the data selection and display element 2!i (step 42). In response to a positive determination in step 42, the data update element will store the data from the data update file in the data files used by the data selection and display element 23 (step 43), and thereafter will terminate.

Returning to step 42, if the data update element 22 makers a negative determination in that step, it will sequence to an error trap (step 45). In processing the error trap, the data update element 22 may, for example, enable an appropriate notice to be displayed to the operator, who may perform predetermined error recovery operations. After processing the error trap (step 45), the data update element 22 will terminate.

It will be appreciated that the detailed operations performed by the data acquisition element 21 and the data update element 22 in retrieving data from the data input files 25(F) and in updating the files used by the data selection and display element 23, will depend on the particular formats of the data input files 25(F) and data selection and display element's files. In one embodiment, the data input files 25(F) are in textual form, in which various types of data are delimited by selected delimiting characters, and the data acquisition element 21 may use conventional text searching techniques in step 33 to search through the data input files 25(F) to obtain the necessary information. As noted above, the data selection and display element 23 in one embodiment uses HyperCard technology to select and display data. Accordingly, the data selection and display element's files will be in a conventional HyperCard format, and the data update element 22 can update the files (in step 43) in a conventional manner.

Figure 5:
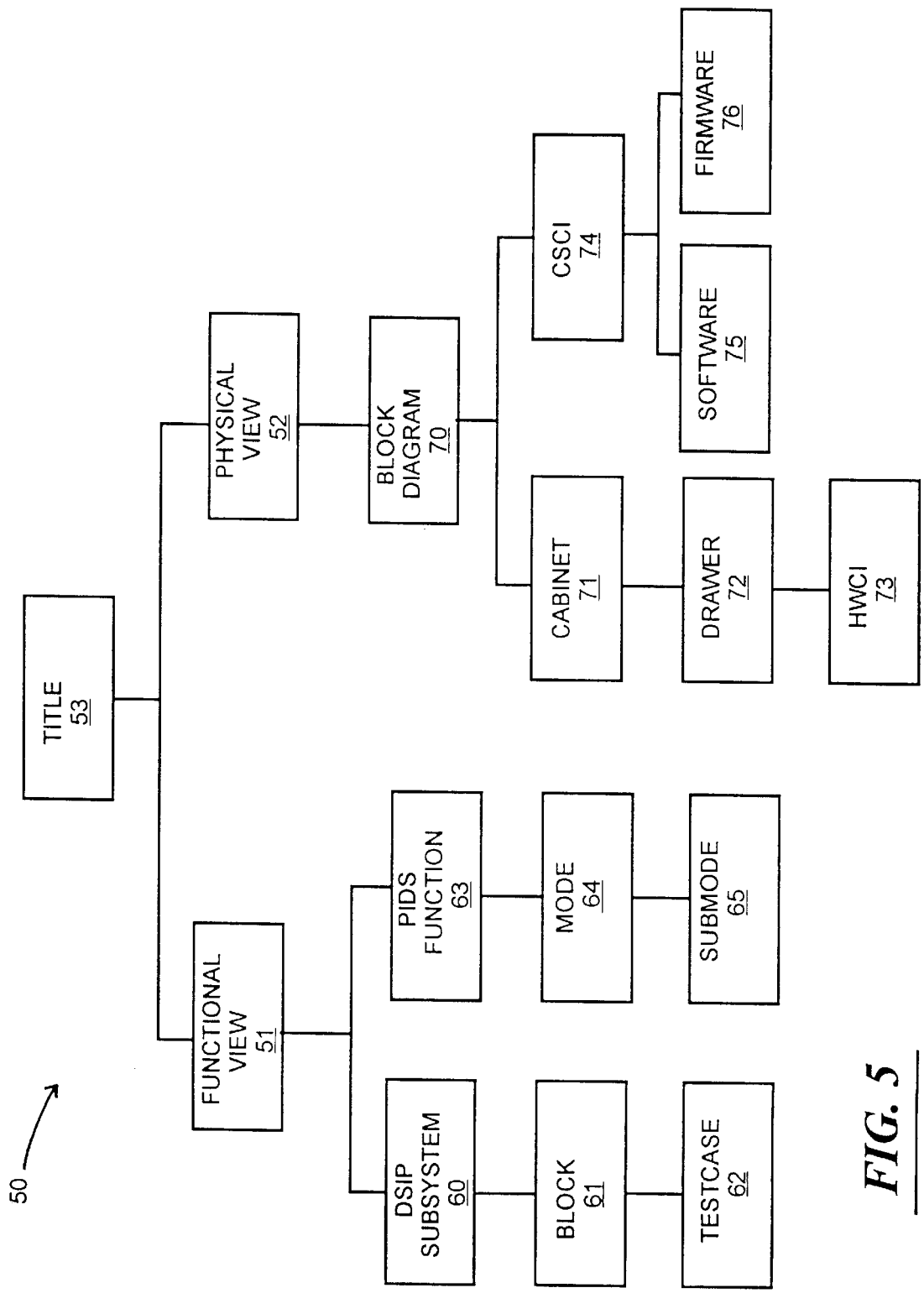
FIGS. 5 through 7 depict the organization of several HyperCard cards useful in understanding the operations of the data selection and display element depicted in FIG. 2.

The data selection and display element 23, as noted above., allows the operator to select selected data and display it as a HyperCard cards on the video display device 13. The structure and operation of the data selection and display element 23 will be described in connection with FIGS. 5 through 7. FIG. 5 depicts a "selection" card 50 which the data selection and display element 23 enables the video display device to display when the data selection and display element 23 is initialized. The selection card 50 essentially provides a data map of the types of data that are available to the operator through the data selection and display element 23, and links to other HyperCard cards available in the data acquisition, organization and display system 20. By way of background, the data acquisition, organization and display system 20 in one embodiment, organizes the data in two hierarchies, identified as "views," namely a functional view and a physical view, and the screen 50 depicted in FIG. 5 allows the operator to select one of the views for further use during a session by means of pushbuttons 51 and 52.

The data map depicted in the FIG. 5 includes a title 53 and the identification of the various types of data which are available in the functional view and the physical view. In particular, in one embodiment, if the functional view is selected, status and other information regarding such items as "Detailed Subsystem Integration Plan" (DSIP), "Prime Item Development Specification" (PIDS) and information relating thereto are available, as indicated in blocks 60–62 and 63–65. On the other hand, if the physical view is selected, status and other information concerning hardware and software configuration items are available, as indicated in blocks 70, 71–73 and 74–76, including a block diagram (represented by block 70).

Each of the pushbuttons 51 and 52 essentially provide HyperCard links to a DSIP Subsystem card stack (represented by blocks 60–62) and a PIDS Function card stack (represented by blocks 63–65), in the case of pushbutton 51, or the block diagram 70 and the hardware configuration item cardstack (represented by blocks 71–73) and computer software configuration cardstack (represented by blocks 74–76) in the case of pushbutton 52. As is conventional, the operator may actuate a pushbutton by moving a pointer, controlled by the mouse 12B (FIG. 1) and clicking thereon with a mouse button (not separately shown).

Figure 6:
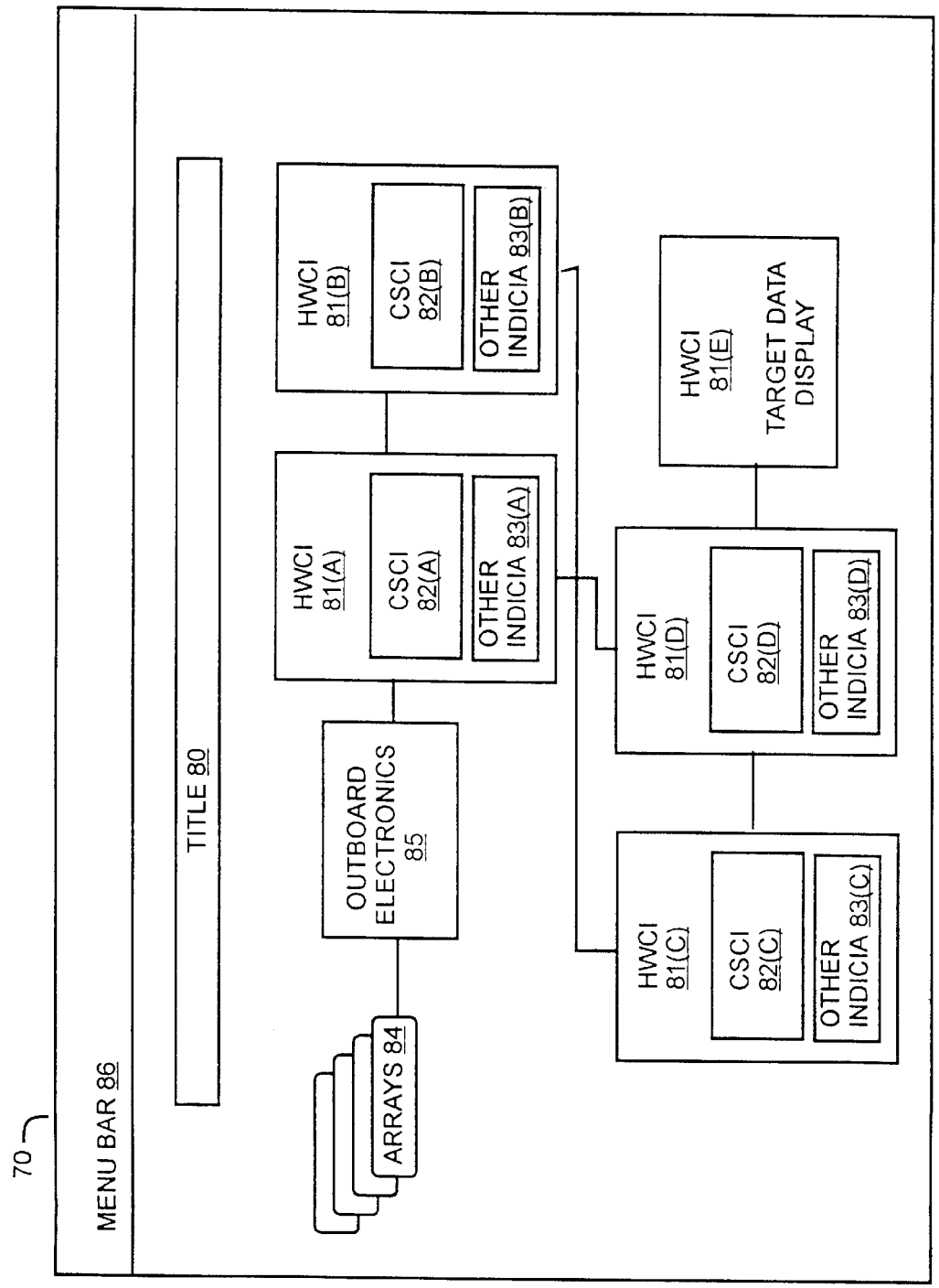

With initial reference to the physical view, which is enabled by pushbutton 52, when the operator actuates the physical view pushbutton 52, the data selection and display element 23 will initially display the block diagram card 70. The block diagram card 70 is a HyperCard card that provides the operator with a block diagram of the various functional blocks of the complex system whose status is being indicated by the data acquisition, organization and display system 20. An illustrative block diagram card 70 is depicted in FIG. 6. FIG. 6 shows the block diagram card as having a title 80, which identifies the particular complex system whose functional block diagram card is represented by the card, various blocks representing the various hardware configuration items ("HWCI") 73 and computer software configuration items ("CSCI") 74 comprising the complex system For the illustrative complex system, as shown in FIG. 6 there are five blocks 81(A) through 81(E) (generally identified by reference numeral 81(h) representing five hardware configuration items in the complex system). One of the hardware configuration item blocks 81(E) is, for example, provided for a video display, as shown in FIG. 6. Other blocks 81(h) are provided for other elements in the complex system.

In addition, there are four blocks 82(A) through 82(D) (generally identified by reference numeral 82(s)) representing four software configuration items in the complex system. Each hardware configuration item which has associated computer software (including "firmware") will have associated therewith a computer software configuration item block 82(s), as shown in FIG. 6. The various hardware configuration item blocks 81(h) nay also have other indicia, represented by blocks 83(h), which may be helpful in understanding the operation of the hardware configuration item associated with the respective block 81(h). The functional block diagram card 70 may also include blocks, such as represented by array blocks 84 and an outboard electronics block 85, which represent elements external to the! complex system represented by the data acquisition, organization and display system 20. The functional block diagram card 70 further depicts lines interconnecting the hardware configuration item blocks 81(h), as well as any external elements, as required in the complex system.

The block diagram card 70 further includes a menu bar 86,, which, inter alia, enables the operator to navigate among HyperCard cards in other portions of the physical view stack, represented by blocks 71–76 (FIG. 5). In particular, the menu bar 86 includes entries (not shown) that allow an operator to select a hardware configuration item or a computer software configuration item whose status information is to be displayed, which the operator can actuate in a conventional manner. In addition, since the block diagram card 70 is a HyperCard card., the operator can select a hardware configuration item or computer software configuration item whose status information is to be displayed by clicking on a hardware configuration item block 81(h) or a computer software configuration item block 82(h). When the operator selects an appropriate "computer software configuration item" entry in the menu bar 86, or clicks on a computer software configuration item block 82(h), the data selection and display element 23 displays a list of computer software configuration items, one of which the operator may select with the mouse 12B in a conventional manner. On the other hand, when the operator selects an appropriate "hardware configuration item" entry in the menu bar 86, or clicks on a hardware configuration item block 81(h) in the block diagram card 70, the data selection and display element 23 will display a HyperCard card representing a HyperCard "cabinet" for hardware configuration item cards, which will be described in connection with FIG. 7.

The specific organization and contents of a computer software configuration item card will depend on the particular information to be displayed, and will not be specifically described herein. In one embodiment, a computer software configuration item card for a particular item will include such information as the PIDS and DISP which applies to the computer software configuration item, the size of the computer software configuration item, scheduling status (planned and actual) and so forth.

Figure 7:
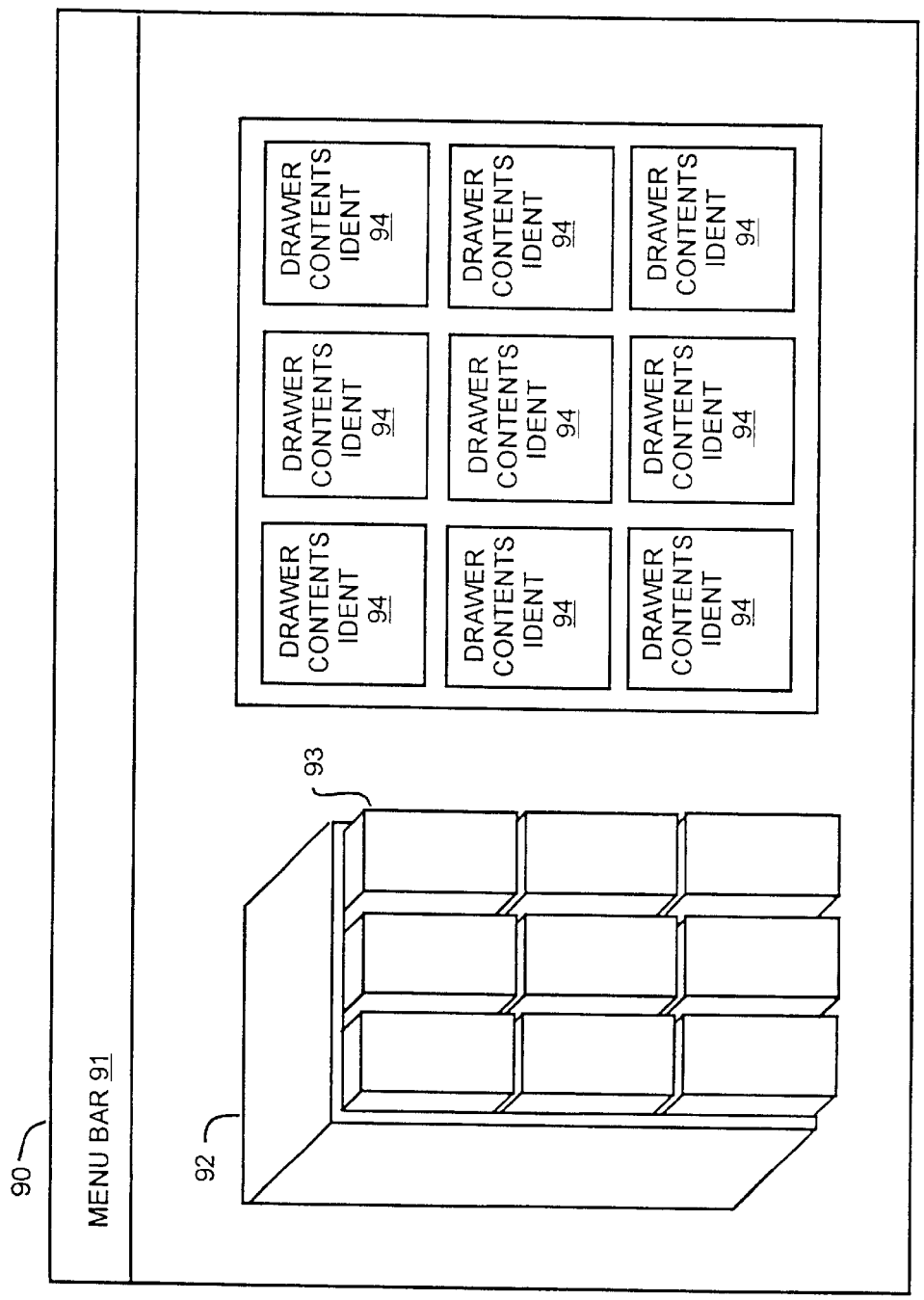

As noted above, when the operator selects an appropriate "hardware configuration item" entry in the menu bar 86, or clicks on a hardware configuration item block 81(h) in the block diagram card 70, the data selection and display element 23 will display a HyperCard card representing a HyperCard "cabinet" for hardware configuration item cards. An illustrative HyperCard cabinet card, identified by reference numeral 90 is depicted in FIG. 7. (The cabinet card 90 corresponds to the cabinet block in the data map 50 depicted in FIG. 5.) With reference to FIG. 7, the cabinet card 90 includes a menu bar 91, which is similar to menu bar 86 (FIG. 6) used with the block diagram card 50. The cabinet card 90 also includes a cabinet graphic 92 that includes a number of drawer graphics generally identified by reference numeral 93, each of which is associated with a hardware configuration item in the complex system. Adjacent the cabinet graphic 92 is a plurality of blocks, which has the same organization as the drawer graphics 93 in the cabinet graphic 92, listing the particular elements of one of the hardware configuration items. The operator may select a block 94 associated with a desired hardware configuration item with the mouse 12B in a conventional manner. After selection, the data selection and display element 23 will display a hardware configuration item card which, like the computer software configuration item card, will have a specific organization and contents which will depend on the particular information to be displayed. Accordingly, the specific organization and contents of a hardware configuration item card will not be specifically described herein. In one embodiment, a hardware configuration item card for a particular item will include such information as the computer software configuration items associated with the hardware configuration item, certain hardware design information, scheduling information and so forth.

Returning to FIG. 5, as described above the operator can also select the "functional" view during a session by actuating the pushbutton 51. If the operator actuates the pushbutton 51, the data selection and display element 23 will display a series of cards through which the operator may select a DSIP (Detailed Subsystem Integration Plan) card or a PIDS (Prime Item Development Specification) card. After selection, the data selection and display element 23 will display a DSIP card or a, PIDS card which, like the computer software configuration item card and hardware configuration item card as described above, will have a specific organization and contents which will depend on the particular information to be displayed. Accordingly, the specific organization and contents of these cards will not be specifically described herein. In one embodiment, both the DSIP and the PIDS cards will include such information as test summaries and specification revisions which may result from testing or changed requirements. The PIDS card also identifies various computer software configuration items which relate to a particular function, mode and sub-mode (represented by blocks 64 and 65 in the data map 50 depicted in FIG. 5) to which the PIDS card is directed.

The invention provides a number of advantages. In particular, it provides an arrangement whereby an operator may, quickly and easily accumulate status and other information concerning the design and development of a complex system from a number of disparate sources, and view the information in an organized manner.

While the invention has been described as using HyperCard, technology, it will be appreciated by those skilled in the art that it may be implemented in connection with a number of diverse types of technologies.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A digital data retrieving, organizing and displaying system for retrieving information from a number of disparate sources relating to development of a complex system including firmware, hardware and software and organizing and displaying on cards the information as selected by an operator, the digital data retrieving, organizing and displaying system comprising:

data map display means for facilitating the display of a data map defining types of available information relating to the development of the complex system, the data map including at least one external card link;

a plurality of card display means each for facilitating the display of a card having a selected type of information relating to the development of the complex system; and control means responsive to the operator input indicia for controlling the data map display means and the card display means to enable the display of a card having a selected type of information as selected by the operator.

2. A digital data retrieving, organizing and displaying system defined in claim 1 further including information update means for obtaining update information from said disparate sources and updating the information displayed by said card display means.

3. A digital data retrieving, organizing and displaying system as defined in claim 2 in which said information update means includes:

data acquisition means for acquiring update data from a selected data input file; and data update means for using the update data as acquired by said data acquisition means to update the information displayed by said card display means.

4. A digital data retrieving, organizing and displaying system as defined in claim 3 in which the selected data input file is selected by said operator.

5. A digital data retrieving, organizing and displaying system as defined by claim 3 in which said data acquisition means generates an update data file containing acquired update data, the update data file including update verification indicia, the data update means using the verification update data to determine whether it is to use the contents of the update data file in updating the information displayed by the card display means.

6. A digital data retrieving, organizing and displaying system as defined in claim 1 in which said data map includes a physical view section including data representative of physical attributes of the complex system and a functional view section including data representative of functional aspects of the complex system, the data map further having view section selection means for enabling said operator to select one of said sections.

7. A digital data retrieving, organizing and displaying system as defined in claim 6 in which the data map includes operator-actuable physical view pushbutton means and operator-actuable functional view selection means to enable the operator to select one of said sections.

8. A digital data retrieving, organizing and displaying system as defined in claim 6 in which one of the cards displayed by said card display means is a block diagram card displayed in response to selection of the physical view, the block diagram card depicting a physical block diagram of subsystems comprising the complex system.

9. A digital data retrieving, organizing and displaying system as defined in claim 8 in which the block diagram card has at least one actuable link associated with a subsystem of the complex system, the card display means displaying a card depicting status information relating to the subsystem when the link is actuated.

10. A digital data retrieving, organizing and displaying system as defined in claim 9 in which the block diagram card has at least one actuable link associated with a subsystem of the complex system, the card display means displaying a card which depicts a cabinet representing a number of drawers each associated with a portion of the subsystem, each drawer in turn having an actuable link which depicting status information relating to the subsystem when the link is actuated.

\* \* \* \* \*